United States Patent [19]
De Cesare et al.

[11] Patent Number: 6,146,440
[45] Date of Patent: Nov. 14, 2000

[54] PROCESS FOR THE DIRECT PRODUCTION OF CAST IRON FROM IRON BEARING ORE, AND AN APPARATUS SUITABLE TO CARRY OUT SAID PROCESS

[75] Inventors: Alessandro De Cesare, Taranto; Giansilvio Malgarini, Rome; Paolo Granati, Rome; Giuseppe Federico, Rome, all of Italy

[73] Assignee: Centro Sviluppo Materiali S.p.A., Rome, Italy

[21] Appl. No.: 09/230,564

[22] PCT Filed: Jul. 31, 1997

[86] PCT No.: PCT/IT97/00198

§ 371 Date: Aug. 4, 1999

§ 102(e) Date: Aug. 4, 1999

[87] PCT Pub. No.: WO98/04751

PCT Pub. Date: Feb. 5, 1998

[30] Foreign Application Priority Data

Jul. 31, 1996 [IT] Italy ................................ RM96A0551

[51] Int. Cl.$^7$ ..................................................... C21B 11/00
[52] U.S. Cl. .............................................. 75/453; 266/190
[58] Field of Search .................................... 266/158, 182, 266/193, 190, 192; 75/453

[56] References Cited

U.S. PATENT DOCUMENTS 5,662,860 9/1997 Klassen et al. .......................... 266/158

*Primary Examiner*—Scott Kastler
*Attorney, Agent, or Firm*—Browdy and Neimark

[57] ABSTRACT

A process is described for direct production of cast iron starting from iron bearing ore in an apparatus having two communicating chambers in which to carry out the process, comprising the following operations: pre-reduction and pre-heating to founding point of the iron bearing ore in a first substantially cylindrical chamber; final reduction, carburization and founding of the resulting iron in a second chamber arranged below said first chamber, provide the reducing gas both in said second and in said first chamber, provide the reducing gas both in said second and in said first chamber, characterized by the fact that: said iron bearing ore and oxygen are introduced into said first chamber through the side walls thereof, simultaneously but separating, the oxygen being introduced at a speed lower or equal to the speed of introduction of said iron bearing ore; and said oxygen, coal and flux are introduced into said second chamber simultaneously but separately through the side walls thereof and in a manner inclined downwards and towards the center of said second chamber.

22 Claims, 1 Drawing Sheet

PROCESS FOR THE DIRECT PRODUCTION OF CAST IRON FROM IRON BEARING ORE, AND AN APPARATUS SUITABLE TO CARRY OUT SAID PROCESS

DESCRIPTION

The present invention relates to a process and an apparatus for the direct production of cast iron and, more specifically, to a process and an apparatus for the production of cast iron starting from iron bearing ore (hereinafter also indicated as "iron ore") of varying grain size and in various stages of oxidation.

Processes for the indirect production of cast iron from carbon coke and iron bearing ore made to undergo agglomeration are well known and tested and currently represent the only industrial process for production of cast iron in which the production capacity exceeds one million tons per year.

Processes for direct production of cast iron from non-coke carbon and iron bearing material which are not made to undergo agglomeration processes, and in which both materials have a low grain size, are only known on a pilot test level.

In particular, processes are known that have two stages.

A first stage for pre-reduction and pre-heating to a temperature at which the iron bearing ore starts to melt which takes place in a substantially cylindrical chamber, into which the iron bearing ore is driven by means of a plurality of nozzles in such a way as to give it a rotational motion along the walls of the chamber, thus increasing the time that it remains in contact with a reducing gas, for example carbon monoxide, supplied from the lower chamber.

And a second stage for final reduction of the pre-reduced matter obtained in the first chamber, which takes place in a second chamber positioned below the first one and in communication therewith, and normally referred to as a converter chamber, into which a fuel, for example fine coal, and an element supporting combustion, for example oxygen, are input to create a hot reducing gas capable of reducing the compound coming from the first pre-reduction chamber in a smelted condition through delivery of the gas produced in the first pre-reduction and pre-heating chamber.

In the first chamber the energy required by the chemical reactions and physical transformations that take place is provided by post-combustion of the reducing gas, generated by gasification of the coal, with the oxygen injected into the converter and the oxygen bound to the iron ore.

According to a method that forms part of the state of the art is known the use of a central nozzle for emission into the second chamber (converter) of fuel and oxygen.

The use of the central nozzle in the converter reduces the uniformity of distribution of the coal and oxygen with respect to the overall surface area of the metal bath at which these raw materials are aimed.

Furthermore, according to a method foreseen in the European Patent No. EP 0 690136, the central nozzle solution can cause problems in long-term operation of the cyclone; in effect this nozzle can become an obstacle to the uniform performance of the chemical reactions and create a surface on which deposits can form, resulting in partial blockage of the working area.

For this reason, in spite of the progress made to date in this field, the problems relating to processes for the direct and continuous production of cast iron from iron bearing ore, and the identification of apparatuses suitable to carry out said processes and capable of giving highly flexible production, remain substantially unsolved.

The aim of the present invention is therefore to provide a process for the direct and continuous production of cast iron and an apparatus suitable to carry out said process, said apparatus not involving the use of central nozzles, and being capable of guaranteeing a high level of production flexibility.

This aim is achieved by the present invention by means of the use of side nozzles to inject coal, flux and oxygen into the converter.

In fact in this way there is a greater uniformity of distribution of said materials throughout the cross section of the converter, more effective stirring of the slag which in this way increases the reduction kinetics and the heat exchange between slag/bath/gas, and greater flexibility in the post-combustion levels that can be achieved in the converter.

The object of the present invention is a process for the direct production of cast iron starting from iron bearing ore, in an apparatus having two chambers in communication with one another in which to carry out the process, comprising the following operations:

pre-reduction and pre-heating to smelt of the iron bearing ore in a first substantially cylindrical chamber, in which the iron bearing orre and oxygen are introduced through the side walls thereof;

final reduction carburizing in a second chamber followed by melting of the resulting iron from the chamber arranged below said first chamber, in which coal and oxygen, injected into said second chamber, provide the reducing gas both in said second and in said first chamber, characterised by the fact that:

said iron bearing ore and oxygen are introduced into said first chamber through the side walls thereof, simultaneously, the oxygen being introduced at a speed lower or equal to the speed of introduction of said iron bearing ore; and said oxygen, coal and flux are introduced into said second chamber simultaneously, but separately through nozzles in the side walls thereof and in a manner inclined downwards and towards the centre of said second chamber.

Furthermore, the present invention provides an apparatus for the direct production of cast iron starting from iron bearing ore, comprising:

a first chamber having a substantially cylindrical shape;

means for supplying iron bearing ore to said first chamber;

first means for supplying oxygen to said first chamber;

a second chamber having a substantially cylindrical shape, with a diameter greater than that of the first chamber, arranged underneath said first chamber and in communication therewith by means of a connector in the shape of a truncated cone;

second means for supplying oxygen to said second chamber;

means for supplying fuel and flux to said second chamber;

third means for supplying oxygen to said second chamber; and a gas outlet pipe connected with the top part of said first chamber;

characterised by the fact that said second means supplying oxygen to said second chamber are made up of nozzles inclined downward and equally spaced one from the other along the perimeter of said second chamber.

BRIEF DESCRIPTION OF THE DRAWING

The single FIGURE enclosed shows an axonometric projection of an apparatus according to the present invention.

So far, a general description has been given of the present invention. With the aid of an example a more detailed description of a preferred embodiment of the invention will now be given, with the aim of clarifying the aims, characteristics, advantages and operating methods thereof.

EXAMPLE

Figure 1:
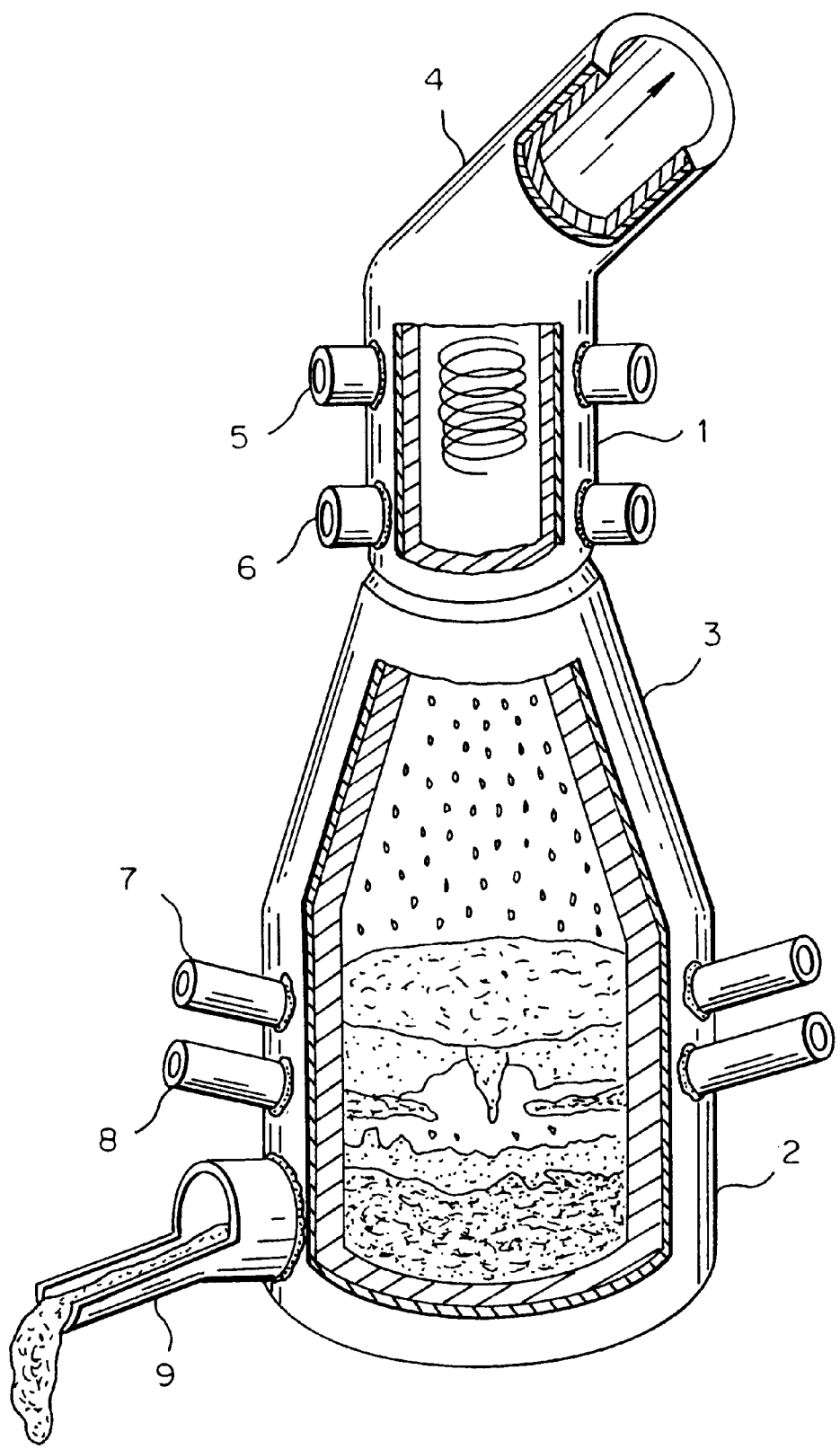

The apparatus is made up of a first cylindrical body 1 and a second cylindrical body 2, arranged underneath the first body 1 and connected to the latter by means of a truncated cone connector 3. The cylindrical body 1 is connected at the top to an outlet pipe 4 (partially illustrated in the FIGURE) which has the job of connected at the top to an outlet pipe 4 (partially illustrated in the FIGURE) which has the job of transferring the gas produced during the process to the outside of the apparatus.

For the sake of simplicity, the first cylindrical body 1 will be indicated in the following as the "cyclone" and the second cylindrical body 2 will be indicated as the "converter".

The cyclone 1 has two injection levels, one for iron ore and one for oxygen.

With reference to the FIGURE, injection takes place through injectors spaced at an equal distance from one another, of which two (5 and 6) are shown in the FIGURE.

Underneath the truncated cone part 3 is the converter, in which final reduction to iron of the iron ore that has been pre-reduced in the cyclone takes place, as does carburization and smelting of the iron produced. In the converter fine coal, flux and oxygen are injected (indicated in the following for the sake of clarity as "primary injection") by means of a number of tuyères 8, the number and positions of which are dependent on the size of the converter (only two of which are illustrated in the FIGURE). The level at which the tuyères are positioned corresponds to a suitable position above the liquid cast iron, in order to avoid re-oxidation of the bath and to obtain a high level of post-combustion.

Also provided, by means of downwards inclined nozzles 7, is the injection of additional oxygen (indicated in the following for the purpose of clarity as "secondary injection") at a higher level than that of the tuyères 8, for post-combustion of the gas.

With the aim of improving heat exchange and mass exchange, the inlet of mixing gas is provided from the bottom of the converter by means of porous plugs (not illustrated in the FIGURE).

The liquid cast iron, together with the slag, is then tapped through the pipe 9.

The characteristics of the embodiment of the apparatus according to the invention used in this example are indicated in the following table.

TABLE 1

| Converter | |
|---|---|
| D: internal diameter | 2 m |
| H: height (including truncated cone connector) | 5.8 m |
| Ratio H/D, between total working height (H) and internal working diameter of the cylindrical part (D) | 2.9 |

TABLE 1-continued

| Converter | |
|---|---|
| Ratio d/D, between internal diameter of cyclone and internal diameter of converter | 0.6 |
| Ratio h/H, between height of cyclone and height of converter | 0.8 |
| Truncated cone connector | |
| Height | 2.3 m |
| Angle of inclination of the connector from converter to cyclone | 78° |
| Ratio between height of truncated cone connector and height of converter | 0.4 |

The use of this apparatus allows improvement of the emulsion of coal, gas, slag and liquid metal with a consequent improvement of heat exchange between the gaseous phase ($CO$, $H_2$ produced by partial gasification of the coal) and the metal bath, and of mass exchange between the pre-reduced matter, liquid cast iron and gas.

The process is characterised by two main stages, which take place separately in the two chambers of the reactor and which are:

pre-reduction and pre-heating of the iron ore in the cyclone to the founding point; and final reduction, carburization and founding into liquid cast iron of the pre-reduced iron ore in the converter.

The iron mineral (or iron bearing ore) is input into the cyclone together with the carrier gas that transports it. Simultaneously, oxygen is blown into the cyclone.

Furthermore, a gas coming from the underlying converter is also fed into the cyclone.

This gas is made up of $CO$, $CO_2$, $H_2$, $H_2O$ and $N_2$ and has a temperature of 1600–1800° C.

The $CO$ and the $H_2$ in the gas partially reduce the iron bearing ore (pre-reduction), while the gas as a whole contributes towards pre-heating it.

The oxygen blown into the cyclone reacts with the gas from the converter. This combustion serves to provide the energy necessary to support the reduction reaction and to encourage pre-heating of the iron bearing ore.

The level of pre-reduction and pre-heating obtained are measured by two basic process parameters:

a) the pre-reduction degree (PRD); and b) the temperature of the pre-reduced matter.

By expressing the iron oxide in the pre-reduced matter as $FeO_x$, the PRD is defined as follows:

$$PRD = (1 - x/1.5) \times 100$$

| in which: | $x = 1.5$ | that is to say $Fe_2O_3$ | PRD = 0%; |
| | $x = 1.33$ | that is to say $Fe_3O_4$ | PRD = 11%; |
| | $x = 1$ | that is to say $FeO$ | PRD = 33%. |

The pre-reduced and pre-heated iron bearing ore, in a semi-molten state, passes as a result of gravity into the converter.

It must be taken into account that not all the iron bearing ore is pre-reduced. Part of it is drawn out of the cyclone by the gas leaving the plant through the outlet pipe (4).

In the converter there is a bath of liquid iron and a liquid slag phase on top of the iron.

Final reduction of the pre-reduced matter takes place in the slag phase. Reduction takes place by means of fine coal injected directly into the slag and by means of the $CO$ that is produced both by the reduction reaction and by direct gasification of the coal.

The reactions that result in final reduction of FeO to Fe can be summarised as follows:

$$FeO+C=Fe+CO \qquad (I)$$

$$FeO+CO=Fe+CO_2 \qquad (II)$$

$$2C+3/2O_2=CO+CO_2 \qquad (III)$$

The coal gasification reaction (III) is the result of stabilisation of the chemical balance between the oxidised and reduced iron and coal products in the liquid metal-slag interface.

Following this balance and following the presence of $CO_2$, primary post-combustion takes place in the slag phase.

By blowing oxygen into the converter through the top nozzles 7 secondary post-combustion takes place, which serves to provide energy to reduce the iron bearing ore and to maintain the temperature of the molten products at a suitable level.

Post-combustion is achieved by blowing oxygen through the side walls of the converter into the layer of slag lying on top of the metal bath.

This injection takes place radially on two levels, in the first level through tuyères (8) equipped with concentric coaxial nozzles through the inner part of which the solid mixture of fine coal and flux is fed, and in the second level through nozzles (7) positioned at a higher level.

This arrangement ensures that oxygen is introduced into the converter in the direction of the surface above the bath of molten metal, corresponding to the overlying slag, thus avoiding any interaction between the stream of oxygen and the metal bath.

The parameters describing post-combustion are the primary and secondary post combustion ratio (PCR), in which the PCR is defined as the ratio of the concentrations of oxidised chemicals to the chemicals oxidised and reduced by gas:

$$PCR=(CO_2+H_2O)/(CO+CO_2+H_2+H_2O).$$

The energy produced as head by post-combustion of the gas is transferred with a certain level of efficiency to the liquid phases in which it is required.

The efficiency of energy transfer is known as the Heat Transfer Efficiency (HTE), where HTE is:

1 less the ratio between the excess of energy remaining in the gas after combustion and all the energy that can be transferred as heat.

The gas produced by final reduction and by the two post-combustion phases leaves the converter and enters the cyclone, where it performs pre-reduction and pre-heating of the iron bearing ore.

The iron ore and coal fractions that do not react go to form the slag phase (foam-like top portion and compact underlying portion) which floats on top of the molten iron.

The amount of slag, which influences the reduction kinetics, and the quality of the slag, which influences the composition of the cast iron and its adhesion to refractory surfaces, is controlled by means of addition in the converter of specific fluxes such as CaO and MgO.

The input of mixing gas, for example nitrogen, is provided from the bottom of the converter, by means of porous plugs.

The following is an example of an embodiment of the process for direct production of cast iron starting from iron bearing ore and of the apparatus suitable to carry out said process. The specifications of the embodiment of the process according to the invention used in the example are summarised in the following table.

TABLE 2

| | |
|---|---|
| Post-combustion ratio of gas leaving the cyclone (PCR) | 80% |
| Post-combustion ratio of gas leaving the converter (PCR) | 40% |
| Pressure | 3 bar |
| Heat Transfer Efficiency from the gas to the solid under fusion (cyclone HTE) | 80% |
| Heat Transfer Efficiency from the gas to the metal bath (converter HTE) | 80% |
| Cyclone PCR/HTE | 0.4 |
| Converter PCR/HTE | 0.4 |
| Cyclone (water cooled) | temperature 1700–2000° C. |
| Converter (refractory) | temperature 1500–1700° C. |

Table 3 indicates the materials entering (in kg/h for the solids, $Nm^3/h$ for the gas and temperatures in ° C.), whereas Table 4 indicates the materials leaving the apparatus.

TABLE 3

| Cyclone | |
|---|---|
| Iron bearing ore | 1512 kg/t cast iron |
| | quality: fine iron ore with high Iron content |
| tertiary oxygen | 200 $Nm^3$/t cast iron |
| Converter | |
| coal | 640 $Nm^3$/t cast iron |
| | grain size: 70 micron |
| coal carrier gas | v = 100 m/s |
| primary oxygen | 100 $Nm^3$/t cast iron |
| | v = 250 m/s |
| secondary oxygen | 300 $Nm^3$/t cast iron |
| | v = 250 m/s |
| flux | 100 kg/t cast iron |
| | grain size: 1 micron |
| mixing gas | 700 $Nm^3$/h (nitrogen) |

TABLE 4

| Cyclone | |
|---|---|
| process gas | 1400 $Nm^3$/t cast iron |
| Converter | |
| cast iron | 1000 kg |
| slag | 250 kg |

Table 5 indicates the working dimensions required to carry out the process correctly, in terms of chemical reactions and heat exchange.

TABLE 5

| | |
|---|---|
| Liquid bath mixing power | 1.5 KW/t cast iron |
| Ratio between Mass of cast iron and Mass of slag in the converter | 2 |
| Ratio between Height of foaming top layer of slag and Height of compact slag | 2.7 |
| Ratio between Volume of gas in the slag and Total Volume of foaming slag | 0.6 |

What is claimed is:

1. A process for the direct production of cast iron starting from iron bearing ore in an apparatus having two communicating chambers in which to carry out the process, comprising the following operations:

pre-reduction and pre-heating to smelt the iron bearing ore in a first substantially cylindrical chamber, in which iron bearing ore and a first supply of oxygen are introduced through the side walls thereof;

final reduction carburizing in a second chamber arranged below said first chamber, followed by melting of the resulting iron, wherein coal and a second supply of oxygen are injected into said second chamber to provide the reducing gas, wherein said iron bearing ore and first supply of oxygen are introduced into said first chamber through the side walls thereof simultaneously, the first supply of oxygen being introduced at a speed lower or equal to the speed of introduction of said iron bearing ore; and coal and flux are introduced into said second chamber through chutes in the side walls thereof, and at least part of said second supply of oxygen is introduced into said second chamber simultaneously with but separately from said coal and flux through nozzles in the side walls thereof at a level higher than said chutes and in a manner inclined downwards and towards the center of said second chamber.

2. A process according to claim 1, in which said coal has a grain size of between 0.05 and 3 mm.

3. A process according to claim 2, in which said coal is injected into said second chamber at a speed equivalent to at least 80 m/s.

4. A process according to claim 1, in which said oxygen is injected into said second chamber at a speed equivalent to at least 100 m/s.

5. A process according to claim 1, in which said fluxes have a grain size of below 2 mm.

6. A process according to claim 1, in which the ratio between the volume of gas in the slag and the total volume of foaming slag is at least 0.4.

7. A process according to claim 1, in which the ratio between the mass of cast iron and the mass of slag is between 2.5 and 4.5.

8. A process according to any claim 1, in which the ratio between the Post Combustion Ratio (PCR) and the Heat Transfer Efficiency (HTE) is between 0.3 and 0.5.

9. A process according to claim 1, in which the mixing power in the bath is lower than 2.5 kW per ton of cast iron.

10. A process according to claim 1, in which the height of the foaming layer on top of the slag is at least 2.0 times the height of the compact slag.

11. A process according to claim 1, in which the oxygen introduced into said second chamber is directed towards the surface overlying said molten metal bath, corresponding to the overlying slag.

12. An apparatus for direct production of cast iron starting from iron bearing ore, comprising:

a first chamber having a substantially cylindrical shape;

means for supplying iron bearing ore to said first chamber;

first means for supplying oxygen to said first chamber;

a second chamber having a substantially cylindrical shape, with a diameter greater than that of the first chamber, arranged underneath said first chamber and in communication therewith by means of a connector in the shape of a truncated cone;

second means for supplying oxygen to said second chamber;

means for supplying fuel and flux to said second chamber;

third means for supplying oxygen to said second chamber; and a gas outlet pipe connected with the top part of said first chamber;

characterised by the fact that:

said second means supplying oxygen to said second chamber are made up of nozzles inclined downward and equally spaced one from the other along the perimeter of said second chamber and at a level higher than said means for supplying fuel and flux to said second chamber.

13. An apparatus according to claim 12, in which said means for supplying iron bearing material to said first chamber are made up of injector nozzles arranged around the circumference of said first chamber and equally spaced one from the other.

14. An apparatus according to claim 13, in which said nozzles supplying iron bearing material are arranged in an inclined position with respect to the radial direction of the first chamber.

15. An apparatus according to claim 12, in which said second means supplying oxygen to said second chamber are made up of injector nozzles arranged around the circumference thereof and equally spaced one from the other.

16. An apparatus according to claim 15, in which said injector nozzles supplying oxygen are arranged in an inclined position with respect to the radial direction of the second chamber.

17. An apparatus according to claim 16, in which said nozzles are inclined downward with respect to the horizontal by an angle of between approximately 10° and 40°.

18. An apparatus according to claim 12, in which the ratio between the total height of the second chamber and the internal diameter thereof is between 1.4 and 3.2.

19. An apparatus according to claim 12, in which the ratio between the internal diameter of the first chamber and the internal diameter of the second chamber is between 0.4 and 0.8.

20. An apparatus according to claim 12, in which the ratio between the height of the first chamber and the height of the second chamber is between 0.4 and 1.2.

21. An apparatus according to claim 12, in which the ratio between the height of the truncated cone connector and the height of the second chamber is between 0.3 and 0.5.

22. A process according to claim 1 wherein part of said second supply of oxygen to said second chamber is fed simultaneously with said coal and flux through said chutes.

* * * * *